United States Patent
Kobayashi et al.

(10) Patent No.: US 9,676,071 B2
(45) Date of Patent: Jun. 13, 2017

(54) GUIDE BUSH CONTROL DEVICE AND METHOD OF ADJUSTING GUIDE BUSH

(71) Applicants: Citizen Watch Co., Ltd., Nishitokyo-shi, Tokyo (JP); Citizen Machinery Co., Ltd., Nagano (JP)

(72) Inventors: Yosuke Kobayashi, Tokorozawa (JP); Hikaru Takahashi, Komoro (JP)

(73) Assignees: Citizen Watch Co., Ltd., Tokyo (JP); Citizen Machinery Co., Ltd., Nagano (JP)

( * ) Notice: Subject to any disclaimer, the term of this patent is extended or adjusted under 35 U.S.C. 154(b) by 0 days.

(21) Appl. No.: 14/774,020

(22) PCT Filed: Mar. 6, 2014

(86) PCT No.: PCT/JP2014/055752
§ 371 (c)(1),
(2) Date: Sep. 9, 2015

(87) PCT Pub. No.: WO2014/148267
PCT Pub. Date: Sep. 25, 2014

(65) Prior Publication Data
US 2016/0023314 A1    Jan. 28, 2016

(30) Foreign Application Priority Data

Mar. 18, 2013   (JP) .................................. 2013-054732

(51) Int. Cl.
*B23B 13/00* (2006.01)
*B23Q 1/76* (2006.01)
(Continued)

(52) U.S. Cl.
CPC ................ *B23Q 1/763* (2013.01); *B23B 7/06* (2013.01); *B23B 13/126* (2013.01); *B23B 31/201* (2013.01)

(58) Field of Classification Search
CPC ...... B23B 13/00; B23B 13/022; B23B 13/121; B23B 13/125; B23B 2260/026;
(Continued)

(56) References Cited

U.S. PATENT DOCUMENTS 5,946,992 A  * 9/1999 Ozawa ................. B23Q 39/026
                                                                82/118
9,138,810 B2 * 9/2015 Masuda ..................... B23B 7/00
(Continued)

FOREIGN PATENT DOCUMENTS

CN           1938117 A        3/2007
CN         100515624 C        7/2009
(Continued)

OTHER PUBLICATIONS

Office Action dated Jul. 19, 2016 in Chinese Application No. 201480016541.1.
(Continued)

*Primary Examiner* — Will Fridie, Jr.
(74) *Attorney, Agent, or Firm* — Harness, Dickey & Pierce, P.L.C.

(57) ABSTRACT

A guide bush control device includes a guide bush motor that rotates and drives a guide bush; and a controller that controls driving of the guide bush motor, the guide bush control device controlling rotation of the guide bush by controlling the driving of the guide bush motor with the controller, wherein the controller includes a fixing unit that fixes the guide bush non-rotatably by exciting the guide bush motor in a rotation stop state.

17 Claims, 7 Drawing Sheets

(51) Int. Cl.
*B23B 31/20* (2006.01)
*B23B 7/06* (2006.01)
*B23B 13/12* (2006.01)

(58) Field of Classification Search
CPC .... B23B 2270/34; B23Q 1/763; B23Q 1/766; B23Q 7/06
See application file for complete search history.

(56) References Cited

U.S. PATENT DOCUMENTS

| | | | | |
|---|---|---|---|---|
| 2007/0199415 | A1* | 8/2007 | Ando | B23B 13/022 82/127 |
| 2007/0224007 | A1* | 9/2007 | Shinohara | B23B 13/022 408/146 |
| 2014/0202294 | A1* | 7/2014 | Takahashi | B23B 5/18 82/1.11 |
| 2015/0040732 | A1* | 2/2015 | Ozawa | B23Q 5/045 82/121 |
| 2015/0090084 | A1* | 4/2015 | Kotake | B23B 7/06 82/162 |

FOREIGN PATENT DOCUMENTS

| | | |
|---|---|---|
| CN | 101561672 A | 10/2009 |
| CN | 202177808 U | 3/2012 |
| EP | 1731248 A1 | 12/2006 |
| JP | 8-300201 | 11/1996 |
| JP | 138007 A | 5/1998 |
| JP | H-11-226803 | 8/1999 |
| JP | 200154802 A | 2/2001 |
| JP | 3364427 B2 | 1/2003 |
| JP | 4613161 B2 | 1/2011 |
| JP | 2012-196722 A | 10/2012 |
| KR | 10-1991-0015423 | 9/1991 |
| KR | 10-2006-0127202 A | 12/2006 |
| WO | WO-2005095033 A1 | 10/2005 |
| WO | WO-2013/031818 A1 | 3/2013 |

OTHER PUBLICATIONS

Office Action dated Oct. 7, 2016 in Korean Application No. 10-2015-7023895.
Extended European Search Report dated Oct. 5, 2016 in European Application No. 14769587.8.
International Search Report PCT/ISA/210 for International Application No. PCT/JP2014/055752 Dated May 13, 2014.

* cited by examiner

GUIDE BUSH CONTROL DEVICE AND METHOD OF ADJUSTING GUIDE BUSH

TECHNICAL FIELD

This invention relates to a guide bush control device and a method of adjusting a guide bush.

BACKGROUND ART

A guide bush device in which a guide bush is rotatably supported by a guide bush attachment main body has been known (refer to, for example, Patent Literature 1).

The guide bush is typically rotated and driven by a guide bush motor that is driven and controlled by a controller.

CITATION LIST

Patent Literature

Patent Literature 1: Publication of Examined/Granted Utility Model No. H03-5361

SUMMARY

Technical Problem

The guide bush is inserted into a guide bush sleeve. An adjustment nut is threadably mounted on a back end of the guide bush. The guide bush moves relative to the guide bush sleeve in an axis direction by rotating the adjustment nut, for example. An inner diameter of the guide bush is adjusted by a tapered portion. Since the guide bush is a so-called rotary guide bush that rotates integrally with the guide bush sleeve, it is necessary to rotate the adjustment nut while regulating the rotation of the guide bush by a spanner or the like. It is therefore difficult to adjust the guide bush.

Solution to Problem

To solve the above problem, a guide bush control device of the present invention includes a guide bush motor 12 that rotates and drives a guide bush 11, and a controller 17 that controls driving of the guide bush motor 12, the guide bush control device controlling rotation of the guide bush 11 by controlling the driving of the guide bush motor 12 with the controller 17, wherein the controller 17 includes a fixing unit that fixes the guide bush 11 non-rotatably by exciting the guide bush motor 12 in a rotation stop state.

Preferably, the controller 17 includes a rotation regulator 61 that regulates a rotation speed of the guide bush 11 to 0 when a rotation command is sent to the guide bush 11, and the fixing unit excites the guide bush motor 12 with the rotation regulator 61 in operation.

Preferably, the guide bush control device further includes a manual operator 48 that generates a signal for driving the guide bush motor 12 by a manual operation, wherein the controller 17 includes a manual operation regulator 59 that invalidates the signal from the manual operator 48, and the fixing unit excites the guide bush motor 12 with the manual operation regulator 59 in operation.

Preferably, the guide bush 11 is disposed in a cover 2 of a machining tool 1, and the fixing unit starts excitation of the guide bush motor 12 while an openable and closable door 3 provided in the cover 2 is closed.

Preferably, the guide bush 11 is driven by a main spindle motor 9 that drives a main spindle 6 of a machining tool 1, and the guide bush 11 is fixed non-rotatably by exciting the main spindle motor 9.

Preferably, the guide bush motor 12 and the main spindle motor 9 are separately provided, and the guide bush motor 12 is driven in synchronization with the main spindle motor 9.

Preferably, the main spindle motor operates as the guide bush motor, and the main spindle and the guide bush are integrally rotated and driven by the main spindle motor.

A method of adjusting a guide bush of a guide bush device including a guide bush motor 12 that rotates and drives the guide bush 11 and a controller 17 that controls driving of the guide bush motor 12, rotation of the guide bush 11 being controlled by controlling the driving of the guide bush motor 12 with the controller 17 includes the step of fixing the guide bush 11 non-rotatably by exciting the guide bush motor 12 in a rotation stop state by controlling the driving of the guide bush motor 12 with the controller 17 when adjusting the guide bush 11.

Advantageous Effects

According to the above-described configurations of the present invention, the guide bush motor is excited in a rotation stop state to fix the guide bush non-rotatably by the fixing unit. Therefore, it is not necessary for an operator to regulate the rotation of the guide bush with a spanner for adjusting the guide bush. The rotation of the guide bush is therefore easily regulated by the fixing unit, and the inner diameter of the guide bush can be easily adjusted.

The guide bush motor is excited with the rotation regulator or the manual operation regulator in operation. With this configuration, even when a rotation command at a predetermined rotation speed is sent to the guide bush motor from the controller on erroneous activation, the rotation of the guide bush motor is regulated. The guide bush is therefore fixed non-rotatably, and is prevented from being erroneously rotated. A safety of an operation such as an adjustment of the inner diameter of the guide bush can be secured.

When the guide bush is positioned in the cover of the machining tool, the excitation of the guide bush motor starts while the openable and closable door provided in the cover is closed. With this configuration, it is possible to start the excitation of the guide bush before opening the door. It is therefore possible to start the excitation of the guide bush motor before opening the door to adjust the inner diameter.

In this case, when adjusting the inner diameter of the guide bush, the door can be opened to adjust the inner diameter of the guide bush after it is confirmed that the rotation of the guide bush is stopped. It is therefore possible to improve operational safety and to prevent the guide bush from being erroneously rotated.

When the main spindle motor that drives the main spindle and the guide bush motor are separately provided and driven in synchronization with each other, the guide bush motor can be indirectly excited by exciting the main spindle motor.

When the main spindle and the guide bush are rotated and driven by one main spindle motor, the main spindle motor also operates as the guide bush motor. With this configuration, the guide bush can be fixed non-rotatably by exciting the main spindle motor in a rotation stop state.

DESCRIPTION OF EMBODIMENT

Figure 1A:
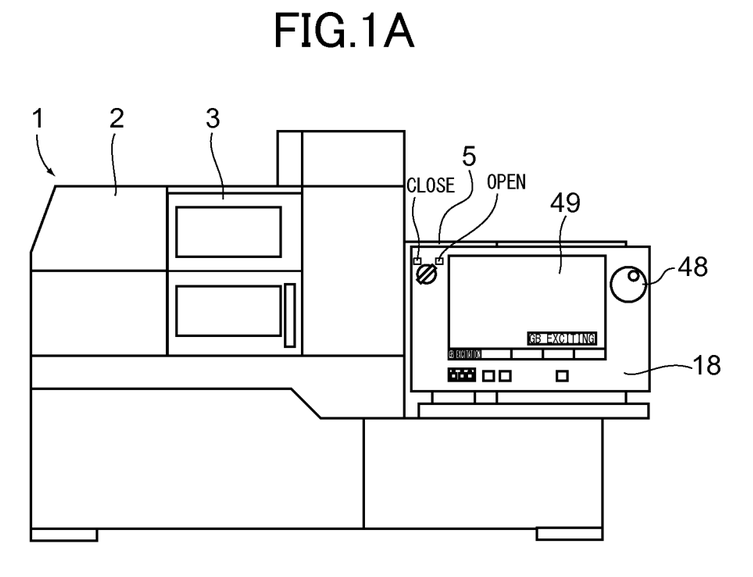
FIG. 1A is a front view illustrating an automatic lathe with a door closed.
Figure 1B:
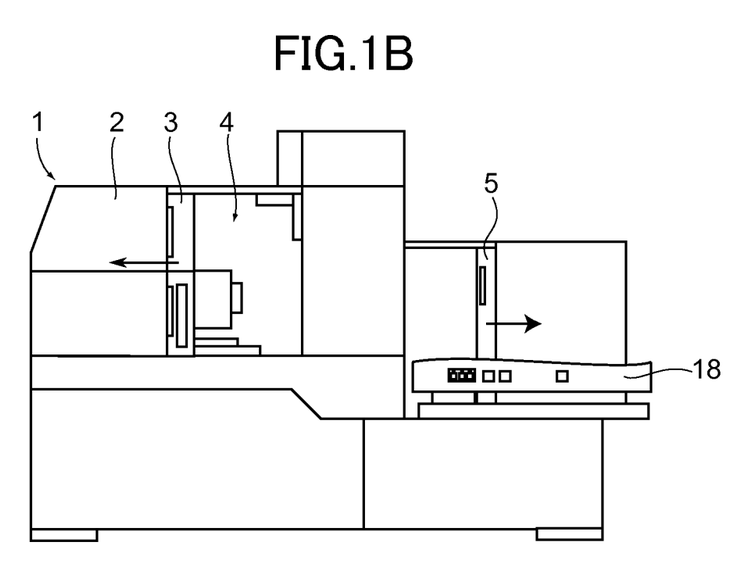
FIG. 1B is a front view illustrating the automatic lathe with the door opened.
Figure 2:
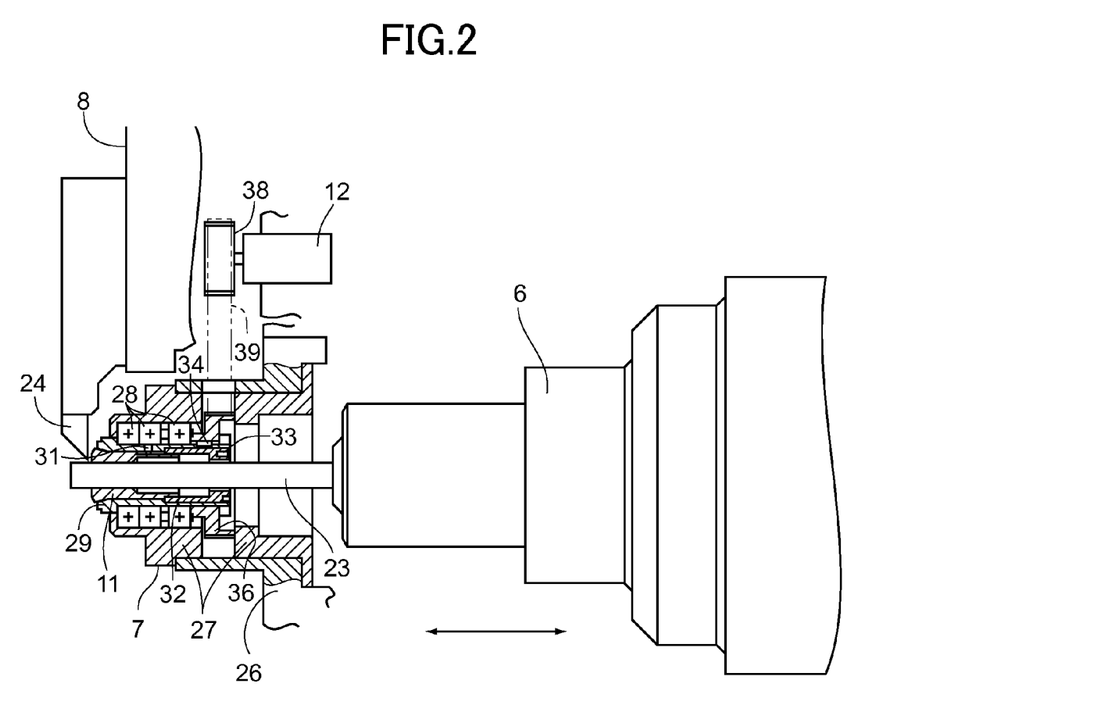
FIG. 2 is a cross-section view illustrating major components of a guide bush device.

FIGS. 1A and 1B are front views illustrating an automatic lathe 1 as a machining tool including a guide bush control device of the present invention. The automatic lathe 1 includes a cover 2. The cover 2 includes an openable and closable machining chamber door 3 and a main spindle side door 5 (hereinafter referred to as doors 3 and 5). A main spindle 6, a guide bush device 7, a tool post 8, and the like illustrated in FIG. 2 are provided in a machining chamber 4 formed in the cover 2.

Figure 3:
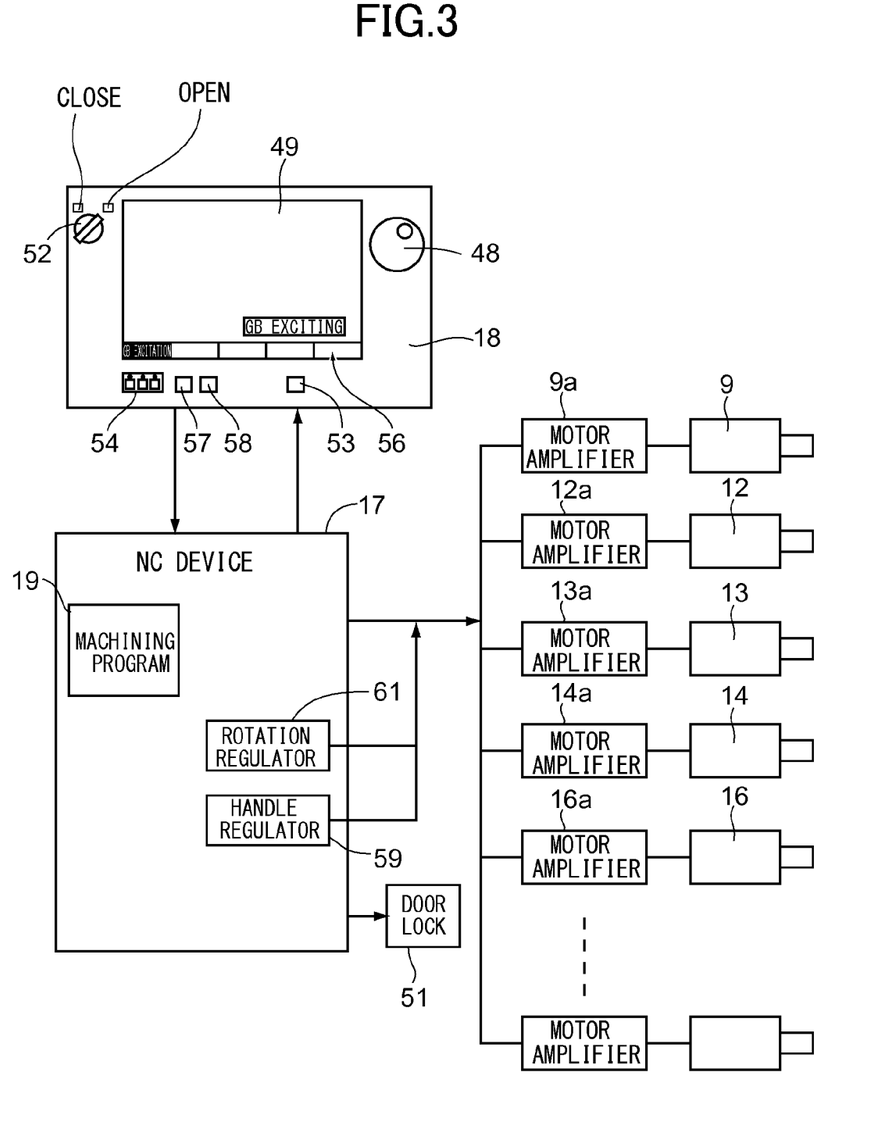
FIG. 3 is a block diagram illustrating major components of a controller.

As illustrated in FIG. 3, the main spindle 6 is rotated and driven by a main spindle motor 9 and a guide bush 11 provided in the guide bush device 7 is rotated and driven by a guide bush motor 12. A head stock (not shown) on which the tool post 8 and the main spindle 6 are mounted is moved and driven by an X-axis motor 13, a Y-axis motor 14, a Z-axis motor 16, and the like. Each motor is controlled by a controller 17 as an NC (Numerical Control) device.

The controller 17 is provided with an operation panel 18 for operating the controller 17, for example. The operation panel 18 includes a manual pulse handle 48, various switches, and a monitor 49, and is connected to the controller 17. A machining program 19 is previously input to the controller 17. The controller 17 can control motor amplifiers 9a, 12a, 13a, 14a, and 16a as drivers of the respective motors 9, 12, 13, 14, and 16 based on the machining program 19 to control the driving of the respective motors 9, 12, 13, 14, and 16 to control the main spindle 6, the guide bush 11, the tool post 8, and the like.

The main spindle 6 holds a rod-shaped material 23. The rod-shaped material 23 is inserted into the main spindle 6 from the back end. The material 23 held by the main spindle 6 is inserted into the guide bush 11. The inner diameter of the guide bush 11 is adjusted according to the diameter of the material. The guide bush 11 to guide the material 23 to rotate and move in the axis direction is rotated and driven by the guide bush motor 12.

The automatic lathe 1 is configured to automatically execute a predetermined process to the material 23 by a tool 24 mounted on the tool post 8 while guiding the material 23 by the guide bush 11 according to the machining program 19 in an automatic drive mode of the controller 17. The automatic lathe 1 is configured to manually execute a machining operation to the material 23 according the machining program 19 in accordance with a pulse signal generated by the rotation operation of the manual pulse handle 48 in a manual execution mode of the controller 17.

The guide bush device 7 is attached to a guide bush supporting post 26 provided on the bed side of the automatic lathe 1 in a standing manner. The guide bush device 7 includes an outer sleeve 27 as an exterior that is detachably fixed to the guide bush supporting post 26. The guide bush sleeve 29 is rotatably supported in the outer sleeve 27 via a bearing 28. The guide bush 11 is inserted into the guide bush sleeve 29.

The guide bush sleeve 29 includes a tapered surface corresponding to a tapered surface of the guide bush 11. The guide bush 11 is disposed in the guide bush sleeve 29 such that their tapered surfaces contact with each other. The rotation of the guide bush 11 is stopped relative to the guide bush sleeve 29 by a key 31. An adjustment nut 32 is threadably mounted on the back end portion of the guide bush 11.

The guide bush 11 moves relative to the guide bush sleeve 29 in the axis direction by rotating the adjustment nut 32. By the motion of the guide bush 11, the tapered surfaces are pressed to thereby adjust the inner diameter of the guide bush 11 according to a state of pressed tapered surfaces. A bolt 33 is threadably mounted on the adjustment nut 32 to expand the outer diameter of the back end portion thereof. The outer diameter of the back end portion of the adjustment nut 32 expands by tightening the bolt 33. The adjustment nut 32 is pressed to the inner wall of the guide bush sleeve 29, and is fixed at the correct position to the guide bush sleeve 29.

The adjustment nut 32 is fixed to the guide bush sleeve 29 at a predetermined rotation angle. The guide bush 11 is thereby adjusted to a predetermined inner diameter to be fixed. The outer diameter of the back end portion of the adjustment nut 32 is decreased by loosening the bolt 33. The adjustment nut 32 becomes rotatable to adjust the inner diameter of the guide bush 11.

A timing pulley 36 is integrally attached to the back end side of the guide bush sleeve 29 via a key 34. The guide bush motor 12 is attached to the guide bush supporting post 26. A timing pulley 38 is fixed to a rotation shaft of the guide bush motor 12.

A timing belt 39 is wound around the timing pulleys 36 and 38. The guide bush 11 is driven by the guide bush motor 12 to rotate and drive integrally with the guide bush sleeve 29. In the guide bush device 7, the guide bush 11 is a rotary guide bush that is rotated and driven by the guide bush motor 12.

Figure 4:
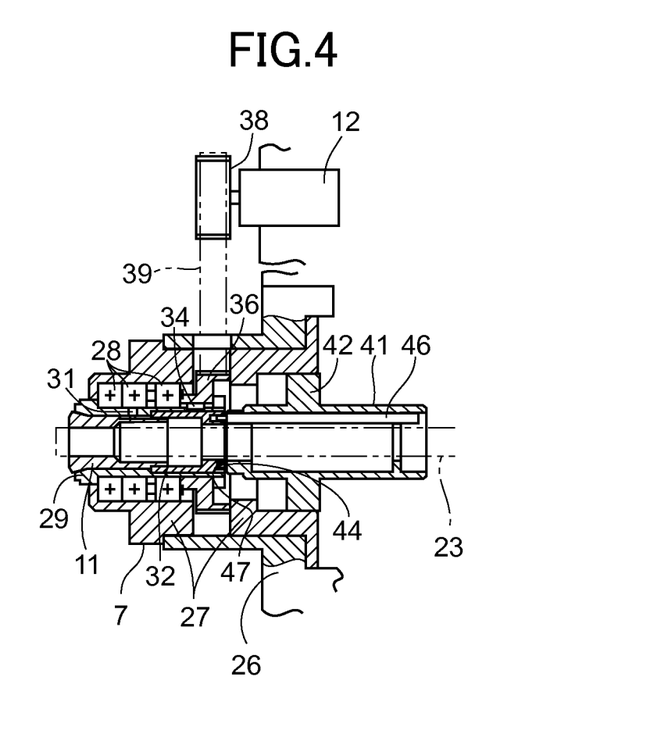
FIG. 4 is a cross-section view illustrating major components of the guide bush device on which an adjustment jig is mounted.
Figure 5A:
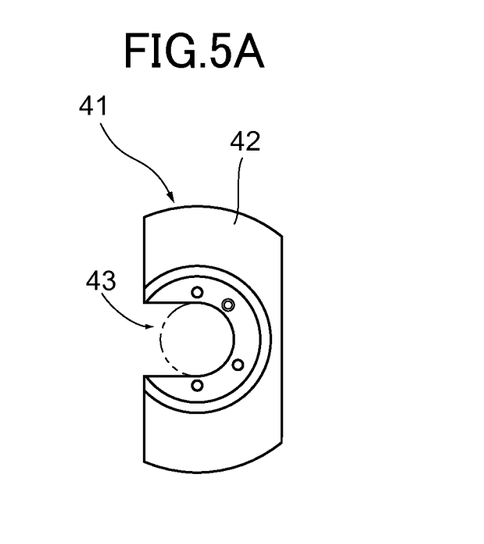
FIG. 5A is a front view illustrating the adjustment jig.
Figure 5B:
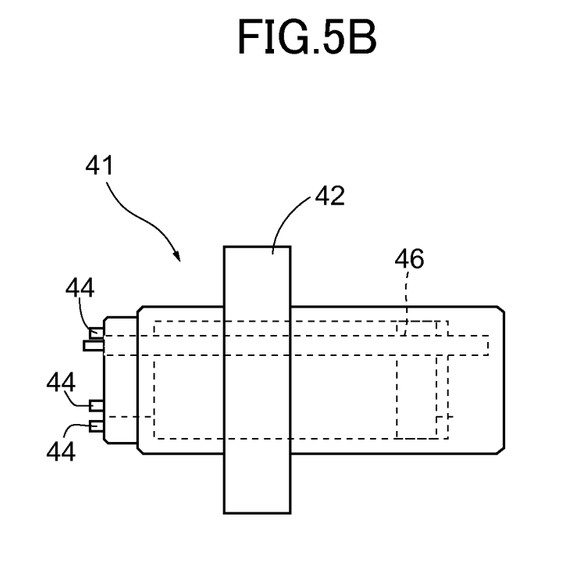
FIG. 5B is a side view illustrating the adjustment jig.

As illustrated in FIG. 4, an adjustment jig 41 for operating the adjustment nut 32 is detachably attached to the guide bush device 7. As illustrated in FIGS. 5A and 5B, the adjustment jig 41 includes a flange 42 and a cutout 43. Adjustment pins 44 project from a leading end surface of the adjustment jig 41. The jig 41 includes a bolt jig 46 for rotating the bolt 33 (refer to FIG. 2).

For operating the adjustment nut 32, the adjustment jig 41 is inserted into the outer sleeve 27 from the back end, using the outer circumference surface of the flange 42 as a guide. Pin holes 47 into which the adjustment pins 44 are inserted are formed in the back end surface of the adjustment nut 32. The adjustment pins 44 can be inserted into the pin holes 47 by inserting the adjustment jig 41 into the outer sleeve 27.

The bolt 33 is loosened by rotating the bolt jig 46, the adjustment pins 44 are inserted into the pin holes 47, and the adjustment jig 41 is rotated to rotate the adjustment nut 32. The inner diameter of the guide bush 11 can be thereby adjusted. The adjustment jig 41 is removed from the outer sleeve 27 after the adjustment of the inner diameter of the guide bush 11. The adjustment jig 41 can be attached and detached to and from the guide bush device 7 with the workpiece being inserted into the guide bush 11 by inserting the workpiece 23 through the cutout 43.

The controller 17 controls ON and OFF of a door lock 51 that regulates the opening and closing of the doors 3 and 5. The doors 3 and 5 can be opened when the door lock 51 is OFF (release). The doors 3 and 5 are closed and cannot be opened when the door lock 51 is ON.

The operation panel 18 includes a door-open permission key 52 and a door-lock release button 53. The door open permission key 52 is switchable between an open position and a close position. When the door open permission key 52 is in the open position, the controller 17 releases the door lock 51 in response to the turning-on of the door lock release button 53.

While the door open permission key 52 is in the close position, the door lock 51 is not released even when the door lock release button 53 is turned on. An operator can easily adjust the inner diameter of the guide bush 11 and maintain the guide bush 11 by opening the doors 3 and 5.

The controller 17 includes a drive preparation mode for adjusting the automatic lathe 1 in addition to the automatic drive mode and the manual drive mode. Each mode is selectably switched by a mode switch 54 on the operation panel 18. A plurality of menus is displayed on a menu bar 56 of the monitor 49 according to each mode.

The operation panel 18 includes a menu key 57 for selecting various menus and a start switch 58 for starting a menu selected with the menu key 57. The controller 17 can select guide bush excitation (GB excitation) as a menu with the menu key 57 in the drive preparation mode.

The controller 17 includes a handle regulator 59 and a rotation regulator 61. The handle regulator 59 invalidates a signal from the manual pulse handle 48. By activating the handle regulator 59, the rotation and driving of the guide bush motor 12, the main spindle motor 9, and the like when turning the manual pulse handle 48 are regulated.

The rotation regulator 61 forcibly changes the rotation speed of the motor to 0 when a rotation command is sent to each motor. By activating the rotation regulator 61, the rotation regulator 61 regulates the motor amplifiers 12*a* and 9*a* to forcibly drive the guide bush motor 12 and the main spindle motor 9 at a rotation speed of 0 even when the rotation command is issued to rotate the guide bush motor 12 and the main spindle motor 9 at a predetermine rotation speed according to the machining program 19.

By stopping the activation of the handle regulator 59, an operator can manually operate the manual pulse handle 48 to execute the machining program 19 and to manually operate the automatic lathe 1. When the activation of the rotation regulator 61 is stopped, each motor is rotated and driven at a rotation speed according to the machining program 19.

The controller 17 can selectively switch the synchronization and non-synchronization of the guide bush motor 12 and the main spindle motor 9. When the guide bush motor 12 is synchronized with the main spindle motor 9, the driving of the guide bush motor 12 is controlled integrally with the main spindle motor 9. When the guide bush motor 12 is not synchronized with the main spindle motor 9, the driving of the guide bush motor 12 is independently controlled.

When the guide bush motor 12 and the main spindle motor 9 are synchronized, the guide bush 11 and the main spindle 6 are rotated and driven in synchronization. When the guide bush motor 12 and the main spindle motor 9 are not synchronized, the guide bush 11 and the main spindle 6 are separately rotated and driven.

When the guide bush motor 12 is excited in a rotation stop state, a retention torque that retains a rotor of the guide bush motor 12 in a stop position is obtained. Thereby, even if an external force is applied to the rotation shaft of the guide bush motor 12, the rotation stop state of the guide bush motor is maintained by the retention torque. In the guide bush device 7, the rotation shaft of the guide bush motor 12 and the timing pulley 36 are connected via the timing belt 39. The guide bush 11 is thereby fixed non-rotatably by exciting the guide bush motor 12 in a rotation stop state.

The guide bush motor 12 can be excited in a rotation stop state by sending a 0-speed rotation command for rotating the guide bush motor 12 at 0 speed or a C-axis control command for maintaining the stop state of the guide bush motor 12 at a predetermined rotation angle from the controller 17 to the motor amplifier 12*a*.

When the guide bush motor 12 and the main spindle motor 9 are synchronized, the guide bush motor 12 can be stopped in an excitation state by sending the 0-speed rotation command or the C-axis control command only to the main spindle motor 9 (motor amplifier 9*a*) in addition to the sending of such a command to the guide bush motor 12 (motor amplifier 12*a*).

The controller 17 sends the 0-speed rotation command or the C-axis control command to the motor amplifier 9*a* of the main spindle motor 9 or the motor amplifier 12*a* of the guide bush motor 12. The guide bush motor 12 is thereby excited in a rotation stop state to fix the guide bush 11 non-rotatably.

The controller 17 is configured to synchronize the guide bush motor 12 and the main spindle motor 9 to place the motors 9 and 12 in an excited state. In the present embodiment, the controller 17 also sends a synchronization command to the motor amplifier 12*a* of the guide bush motor 12 and the motor amplifier 9*a* of the main spindle motor 9. The guide bush 11 can be also fixed non-rotatably by the synchronization command.

Since the guide bush device 7 of the automatic lathe 1 is a rotary guide bush, it is necessary to adjust the guide bush 11 (for example, inner diameter) by the adjustment jig 41 while the rotation of the guide bush 11 is regulated. The controller 17 becomes activated based on guide bush fixing control shown in the flowcharts of FIGS. 6 and 7 when an operator switches the drive mode of the controller 17 to the drive preparation mode, selects the guide bush excitation as a menu, and turns on the start switch 58 for adjusting the guide bush 11.

The controller 17 is activated based on the guide bush fixing control to function as a guide bush fixing unit that fixes the guide bush 11 non-rotatably by exciting the guide bush motor 12 for adjusting the guide bush 11. An operator can easily adjust the guide bush 11 by regulating the rotation of the guide bush 11 with the guide bush fixing unit.

Figure 6:
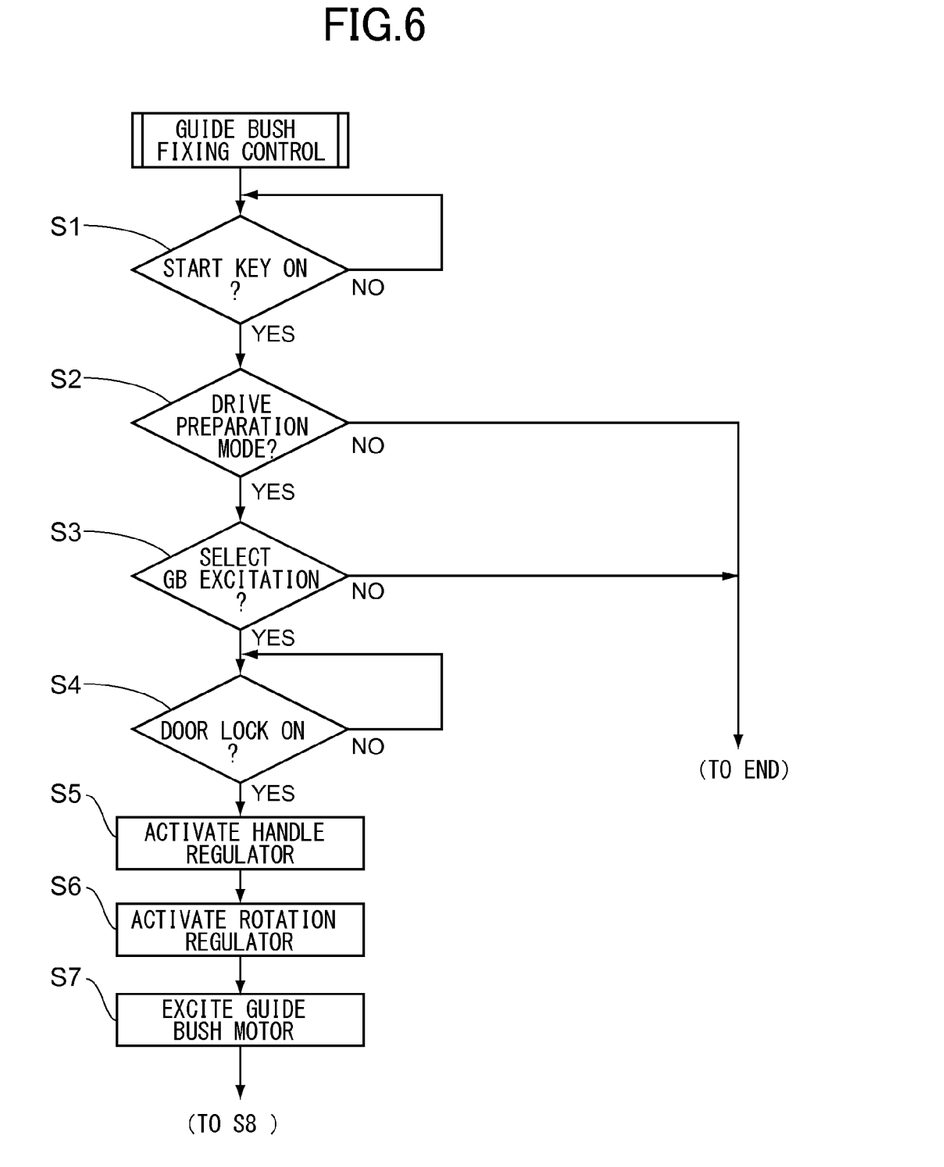
FIG. 6 is a flowchart showing a guide bush fixing control.
Figure 7:
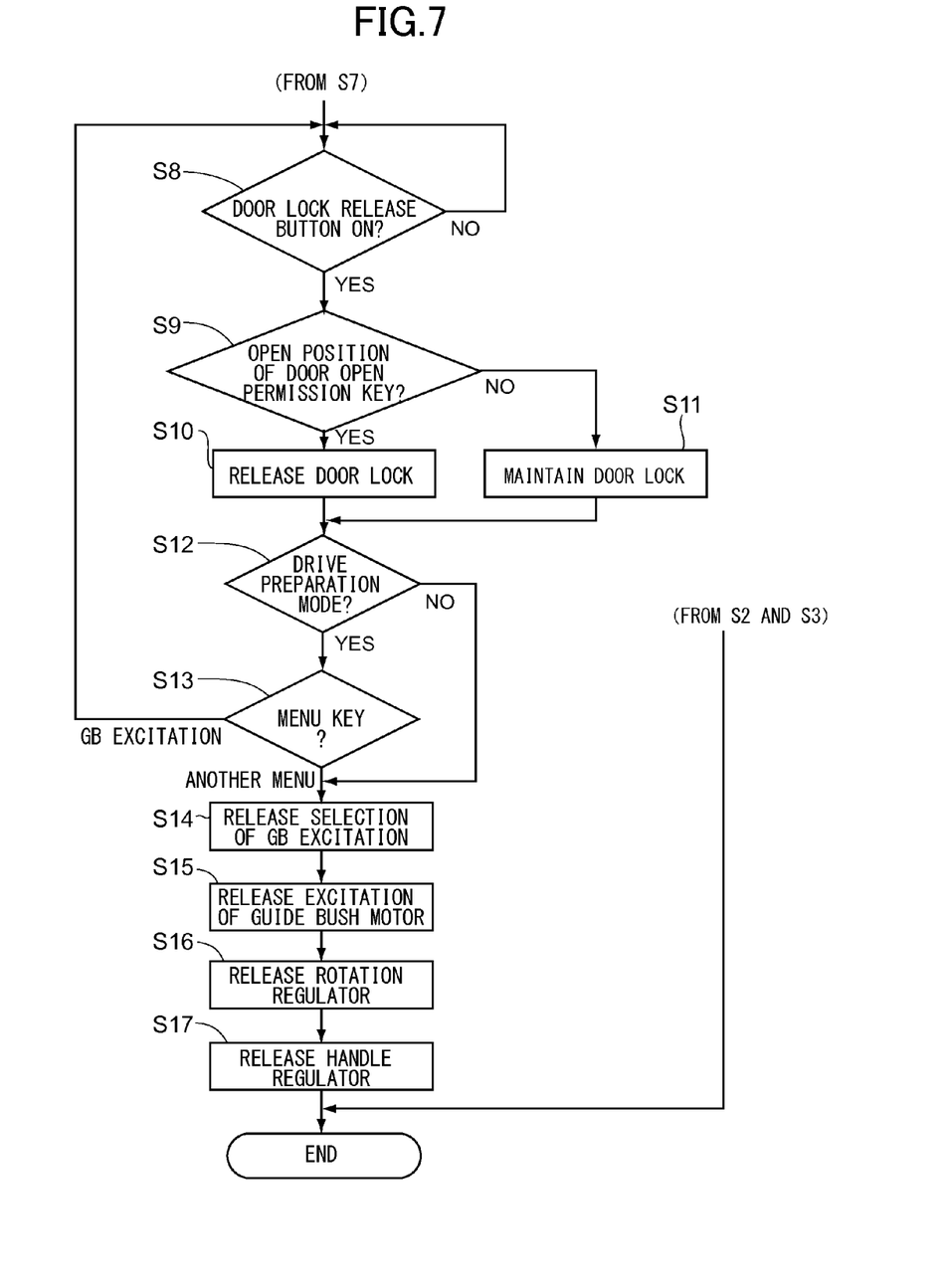
FIG. 7 is a flowchart showing the guide bush fixing control.

As shown in the flowcharts of FIGS. 6 and 7, in the guide bush fixing control, it is determined whether or not the start switch 58 is turned on in Step S1, and it is determined whether or not the device is in the drive preparation mode and the guide bush excitation is selected as a menu in Steps S2 and S3 respectively. The guide bush motor 12 is excited when the guide bush excitation is selected in the drive preparation mode. When the device is not in the drive preparation mode or the guide bush excitation is not selected, the guide bush fixing control is completed.

When the guide bush excitation is selected as a menu in the drive preparation mode, it is determined whether or not the door lock 51 is ON in Step S4. When the door lock 51 is ON, it is determined that the doors 3 and 5 are closed, and the control proceeds to Steps S5 and S6 to activate the handle regulator 59 and the rotation regulator 61. Then, the control proceeds to Step S7.

When the door lock 51 is OFF in Step S4, it is determined that the doors 3 and 5 can be opened. Such a determination is repeated until the door lock 51 becomes ON. In Step S7, the guide bush motor 12 is excited in a rotation stop state to fix the guide bush 11 non-rotatably by sending the 0-speed rotation command, the C-axis control command, or the synchronization command to the motor amplifier 12a of the guide bush motor 12 or the motor amplifier 9a of the main spindle motor 9.

After the guide bush motor 12 is excited in a rotation stop state, it is determined whether or not the door lock release button 53 is ON in Step S8. When the door lock release button 53 is ON, the control proceeds to Step S9, and it is determined whether or not the door open permission key 52 is in the open position. In Step S9, when the door open permission key 52 is in the open position, the control proceeds to Step S10 to release the door lock 51 such that an operator can open the doors 3 and 5.

Since the guide bush 11 is fixed non-rotatably, an operator can open the doors 3 and 5, and easily adjust the guide bush 11 by rotating the adjustment nut 32 with the adjustment jig 41. In Step S9, when the door open permission key 52 is not in the open position, the control proceeds to Step S11. In Step S11, the door lock 51 is maintained. It is therefore necessary for an operator to switch the door open permission key 52 to the open position for opening the doors 3 and 5.

Thereafter, the drive mode is checked. When the device is determined to be in the drive preparation mode in Step S12, the control proceeds to Step S13 to check the selection of the menu key 57. In Step S13, when the guide bush excitation remains selected, the control returns to Step S8 to determine whether or not the door lock release button 53 is ON, and then the subsequent steps are repeated.

When the drive mode is other than the drive preparation mode in Step S12 and when a menu except the guide bush excitation is selected in Step S13, the control proceeds to Step S14, S15, S16, and S17 in order, and the selection of the guide bush excitation is released to stop the excitation of the guide bush motor 12 and to stop the activation of the handle regulator 59 and the rotation regulator 61. Then, the guide bush fixing control is completed.

After the guide bush motor 12 is excited, the fixing of the guide bush 11 is released by switching the drive preparation mode to another drive mode or by selecting a menu except the guide bush excitation with the menu key 57, and the controller 17 can be returned to perform normal automatic driving When the guide bush excitation is selected by the menu key 57 in the drive preparation mode, the start switch 58 is turned on, and the door lock 51 is ON to close the doors 3 and 5, the guide bush 11 is fixed non-rotatably by the excitation of the guide bush motor 12.

Consequently, it becomes unnecessary for an operator to regulate the rotation of the guide bush 11 with a spanner when adjusting the guide bush by the adjustment jig 41, for example. Thus, an operator can easily adjust the guide bush 11. The excitation of the guide bush motor 12 is started when the doors 3 and 5 are locked. Consequently, an operator can open the doors 3 and 5 and adjust the guide bush after confirming that the guide bush 11 is not rotated by an erroneous operation.

The excitation of the guide bush motor 12 is started before the doors 3 and 5 are opened to adjust the guide bush 11 with the adjustment jig 41. Consequently, the doors 3 and 5 can be opened to adjust the guide bush 11 after it is confirmed that the rotation of the guide bush 11 is stopped. A safety of operation can be therefore improved, and the guide bush 11 is prevented from being erroneously rotated.

Since the guide bush motor 12 is excited with the handle regulator 59 and the rotation regulator 61 in operation, the rotation of the guide bush motor 12 is regulated even when a rotation command at a predetermined rotation speed is sent from the controller 17 to the guide bush motor 12 to rotate at a predetermined rotation speed on erroneous activation. The guide bush is therefore prevented from being erroneously-rotated when adjusting the guide bush.

Moreover, an automatic lathe in which a main spindle and a guide bush are linked and driven by a common main spindle motor has been known in addition to the automatic lathe 1 in which the main spindle 6 and the guide bush 11 are rotated and driven by the main spindle motor 9 and the guide bush motor 12 respectively as described in the above embodiment.

In the above automatic lathe in which the main spindle and the guide bush are driven by the common main spindle motor, the main spindle motor can be excited in a rotation stop state to non-rotatably fix the guide bush by sending the 0-speed rotation command or the C-axis control command to the motor amplifier of the main spindle motor.

CROSS-REFERENCE TO RELATED APPLICATION

The present application is based on and claims priority from Japanese Patent Application No. 2013-54732, filed on Mar. 18, 2013, the disclosure of which is hereby incorporated by reference in its entirety.

REFERENCE SIGNS LIST

1 Automatic Lathe (Machining Tool)
3 Machining Chamber Door (Door)
4 Machining Chamber
5 Main Spindle Side Door (Door)
6 Main Spindle
9 Main Spindle Motor
11 Guide Bush
12 Guide Bush Motor
17 Controller
48 Manual Pulse Handle (Manual Operator)
59 Handle Regulator (Manual Operation Regulator)
61 Rotation Regulator

The invention claimed is:
1. A guide bush control device, comprising:
a guide bush motor configured to rotate and drive a guide bush; and
a controller configured to control driving of the guide bush motor,
wherein the controller is configured to control a fixing device to fix the guide bush non-rotatably by exciting the guide bush motor in a rotation stop state.
2. The guide bush control device according to claim 1, wherein the controller includes a rotation regulator configured to regulate a rotation speed of the guide bush to 0 when a rotation command is sent to the guide bush, and
the fixing device configured to excite the guide bush motor with the rotation regulator in operation.
3. The guide bush control device according to claim 1 further comprising
a manual operator configured to generate a signal for driving the guide bush motor by a manual operation, wherein the controller includes a manual operation regulator that configured to invalidate the signal from the manual operator, and the fixing device is configured to excite the guide bush motor with the manual operation regulator in operation.

4. The guide bush control device according to claim 1, wherein the guide bush is in a cover of a machining tool, and the fixing device is configured to start excitation of the guide bush motor while an openable and closable door provided in the cover IS Closed.

5. The guide bush control device according to claim 1, wherein the guide bush is driven by a main spindle motor that drives a main spindle of a machining tool, and the guide bush is fixed non-rotatably by exciting the main spindle motor.

6. The guide bush control device according to claim 5, wherein the guide bush motor and the main spindle motor are separately provided, and the guide bush motor and the main spindle motor are driven in synchronization with each other.

7. The guide bush control device according to claim 5, wherein the main spindle motor configured to operate as the guide bush motor, and the main spindle and the guide bush are integrally rotated and driven by the main spindle motor.

8. A method of adjusting a guide bush of a guide bush device including a guide bush motor that rotates and drives the guide bush and a controller that controls driving of the guide bush motor, the method comprising:

when adjusting the guide bush, fixing the guide bush non-rotatably by exciting the guide bush motor in a rotation stop state by controlling the driving of the guide bush motor with the controller.

9. The guide bush control device according to claim 1, wherein the controller is configured to selectively switch synchronization and non-synchronization of the guide bush motor and the a main spindle motor.

10. The guide bush control device according to claim 9, wherein when the guide bush motor is synchronized with the main spindle motor, the driving of the guide bush motor is controlled integrally with the main spindle motor.

11. The guide bush control device according to claim 9, wherein when the guide bush motor is not synchronized with the main spindle motor, the driving of the guide bush motor is independently controlled.

12. The guide bush control device according to claim 9, wherein when the guide bush motor and the main spindle motor are synchronized, the guide bush and a main spindle are rotated and driven in synchronization.

13. The guide bush control device according to claim 9, wherein when the guide bush motor and the main spindle motor are not synchronized, the guide bush and a main spindle are separately rotated and driven.

14. The guide bush control device according to claim 1, wherein when the guide bush motor is excited in a rotation stop state, a retention torque that retains a rotor of the guide bush motor in a stop position is obtained.

15. The guide bush control device according to claim 1, further comprising a rotation shaft of the guide bush motor and a timing pulley, wherein the rotation shaft of the guide bush motor and the timing pulley are connected via a timing belt.

16. The guide bush control device according to claim 1, further comprising a motor amplifier of the guide bush motor and a motor amplifier of a main spindle motor, wherein the controller is configured to send a synchronization signal to the amplifier of the guide bush motor and the motor amplifier of the main spindle motor.

17. A guide bush control device, comprising:

a guide bush motor configured to rotate and drive a guide bush; and a controller configured to control driving of the guide bush motor, wherein:

the controller is configured to control a fixing device to fix the guide bush non-rotatably by exciting the guide bush motor in a rotation stop state, the guide bush is in a cover of a machining tool, and the fixing device is configured to start excitation of the guide bush motor while an openable and closable door provided in the cover is closed.

* * * * *